UNITED STATES PATENT OFFICE.

WILLIAM H. WALKER, OF NEWTON, MASSACHUSETTS.

CELLULOSE ESTERS.

1,035,108. Specification of Letters Patent. Patented Aug. 6, 1912.

No Drawing. Application filed October 23, 1905. Serial No. 284,077.

*To all whom it may concern:*

Be it known that I, WILLIAM H. WALKER, of Newton, county of Middlesex, State of Massachusetts, have invented an Improvement in Cellulose Esters, of which the following description is a specification.

This invention relates to improvements in organic cellulose esters, as for example the cellulose esters of the fatty acids, such as cellulose acetate, and relates particularly to the dissolving or gelatinizing of these esters by methods involving the use of new solvents and thereby changing their physical condition, resulting in the production of new and useful products.

Heretofore chloroform has been the customary volatile solvent for cellulose acetate, and other organic esters of cellulose, as prepared for example by the methods set forth in U. S. Patent #709,922, granted to Mork, Little and Walker, although other solvents have been suggested, and the adaptation of these esters and their solutions to the purposes of the arts has been hindered or retarded or even in some instances made impossible by the high cost of chloroform, the limitations of its solvent action, the properties of the solutions themselves and the extreme volatility of the solvent.

I have discovered that the halogen substitution products of ethane and especially symmetrical tetrachlorethane or acetylene tetrachlorid are excellent solvents for these esters and especially well-adapted for dissolving or gelatinizing cellulose acetate. Acetylene tetrachlorid for example, is a more powerful solvent for cellulose acetate than chloroform and its volatility is relatively low. These properties have proved themselves to be of great importance in the preparation and handling of cellulose acetate solutions and in the production of films and sheets therefrom insuring better solutions and smoother films and minimizing the difficulties of their preparation. Thus for example, by dissolving one part of cellulose acetate in ten to twelve parts by weight of acetylene tetrachlorid a mixture or solution eminently suitable for a varnish or lacquer is obtained which flows easily and leaves upon evaporation, in thin layers, a smooth, transparent film or coat. Moreover the solvent power of the tetrachlorid is so great that one or two parts of acetylene tetrachlorid will gelatinize one part of cellulose acetate with the production of a mass suitable for molding.

In order to obtain the advantages offered by the use of the halogen substitution products of ethane and especially acetylene tetrachlorid as solvents for cellulose acetate it is unnecessary in many cases that these liquids, and especially acetylene tetrachlorid be used alone, since they are soluble in or miscible with many other liquids which may or may not be of themselves solvents of the acetate or other esters. For example chloroform, acetone, wood alcohol, benzol, etc., may be admixed with acetylene tetrachlorid without destroying its specific solvent action upon cellulose acetate, but with the added advantage of causing the solution to film more quickly than if acetylene tetrachlorid alone was used. The addition of wood alcohol to acetylene tetrachlorid produces a mixture which is an especially powerful and useful solvent for cellulose acetate in spite of the fact that the wood alcohol alone is not a solvent for the ester. Also the use of acetylene tetrachlorid with a solvent of lower boiling point, enables me to prepare solutions of cellulose acetate which spread easily and uniformly and upon evaporation yield films which are both smooth and even, such mixed solvents overcoming the tendency to waviness and the so called "alligator effect" common in films of even moderate thickness formed by the evaporation of solutions in solvents of low boiling point.

The method herein described of changing the physical condition of organic esters of cellulose, as cellulose acetate, by dissolving such esters in a halogen product of ethane and a non-solvent; and also by dissolving such esters in acetylene tetrachlorid and a non-solvent; and also by dissolving such esters in acetylene tetrachlorid and wood alcohol; and the composition of matter herein described consisting of a solution of an organic ester of cellulose, as cellulose acetate, containing a halogen substitution product of ethane and a non-solvent for the ester; and also a solution of such esters containing acetylene tetrachlorid and a non-solvent for the ester; and also a solution of such esters containing a mixture of acetylene tetrachlorid and wood alcohol; form the subject matter of a divisional application filed by me September 12, 1908, Serial No. 452,776.

Having thus described an invention what I claim as new and desire to secure by Letters Patent is:—

1. The method of changing the physical condition of organic esters of cellulose, as cellulose acetate, which consists in dissolving such esters in a halogen substitution product of ethane.

2. The method of changing the physical condition of organic esters of cellulose, as cellulose acetate, which consists in dissolving such esters in a chlorin substitution product of ethane.

3. The process for the manufacture of solutions suitable as lacquers or varnishes and for other industrial purposes, which consists in dissolving a suitable organic compound in acetylene tetrachlorid, substantially as described.

4. The process for the manufacture of solutions suitable as lacquers or varnishes and for other industrial purposes, which consists in dissolving an acidilized cellulose in acetylene tetrachlorid, substantially as described.

5. The process for the manufacture of solutions suitable as lacquers or varnishes and for other industrial purposes, which consists in dissolving acetyl cellulose in acetylene tetrachlorid, substantially as described.

6. The process for the manufacture of solutions suitable as lacquers or varnishes and for other industrial purposes, which consists in dissolving suitable organic compounds in acetylene tetrachlorid and another solvent of the said compound, substantially as described.

7. The method of changing the physical condition of organic esters of cellulose, as cellulose acetate, which consists in dissolving such ester in a mixed solvent containing a halogen substitution product of ethane.

8. The method of changing the physical condition of organic esters of cellulose, as cellulose acetate, which consists in dissolving such ester in a mixed solution containing a chlorid substitution product of ethane.

9. The method of changing the physical condition of organic esters of cellulose, as cellulose acetate, which consists in dissolving such ester in a mixed solvent containing acetylene tetrachlorid.

10. A composition of matter consisting of a solution of an organic ester of cellulose, as cellulose acetate, containing a halogen substitution product of ethane.

11. A composition of matter consisting of a solution of an organic ester of cellulose, as cellulose acetate, containing a chlorin substitution product of ethane.

12. A composition of matter consisting of a solution of acidilized cellulose in acetylene tetrachlorid, substantially as described.

13. A composition of matter consisting of a solution of acetyl cellulose in acetylene tetrachlorid, substantially as described.

14. A composition of matter consisting of a solution of acidilized cellulose in acetylene tetrachlorid and another solvent, substantially as described.

15. A composition of matter consisting of a solution of acetyl cellulose in acetylene tetrachlorid and another solvent, substantially as described.

16. A composition of matter consisting of an organic ester of cellulose, as cellulose acetate and acetylene tetrachlorid and a solvent of low boiling point.

In testimony whereof, I have signed my name to this specification, in the presence of two subscribing witnesses.

WILLIAM H. WALKER.

Witnesses:
ARTHUR D. LITTLE,
C. FRANK SAMMET.